Patented Feb. 28, 1950

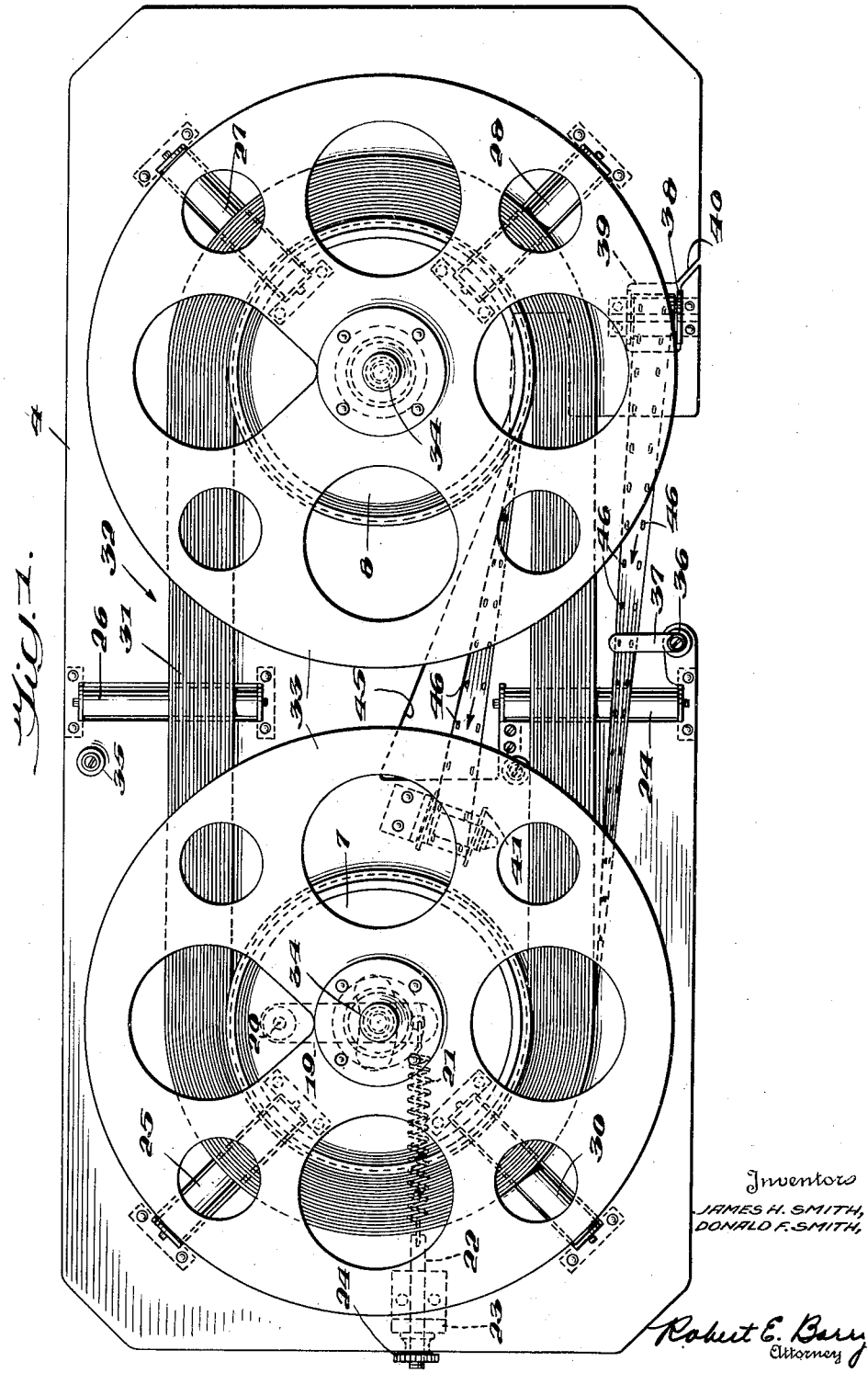

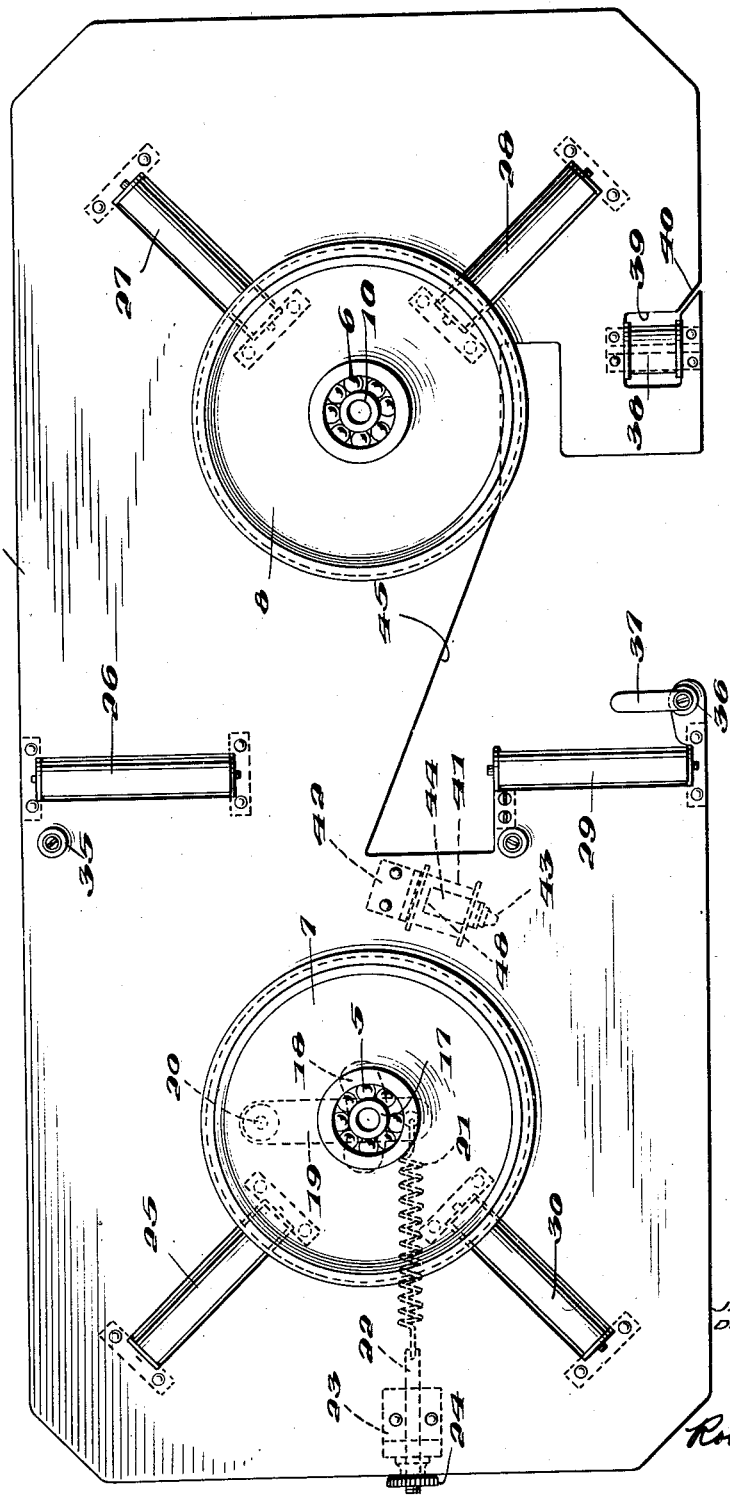

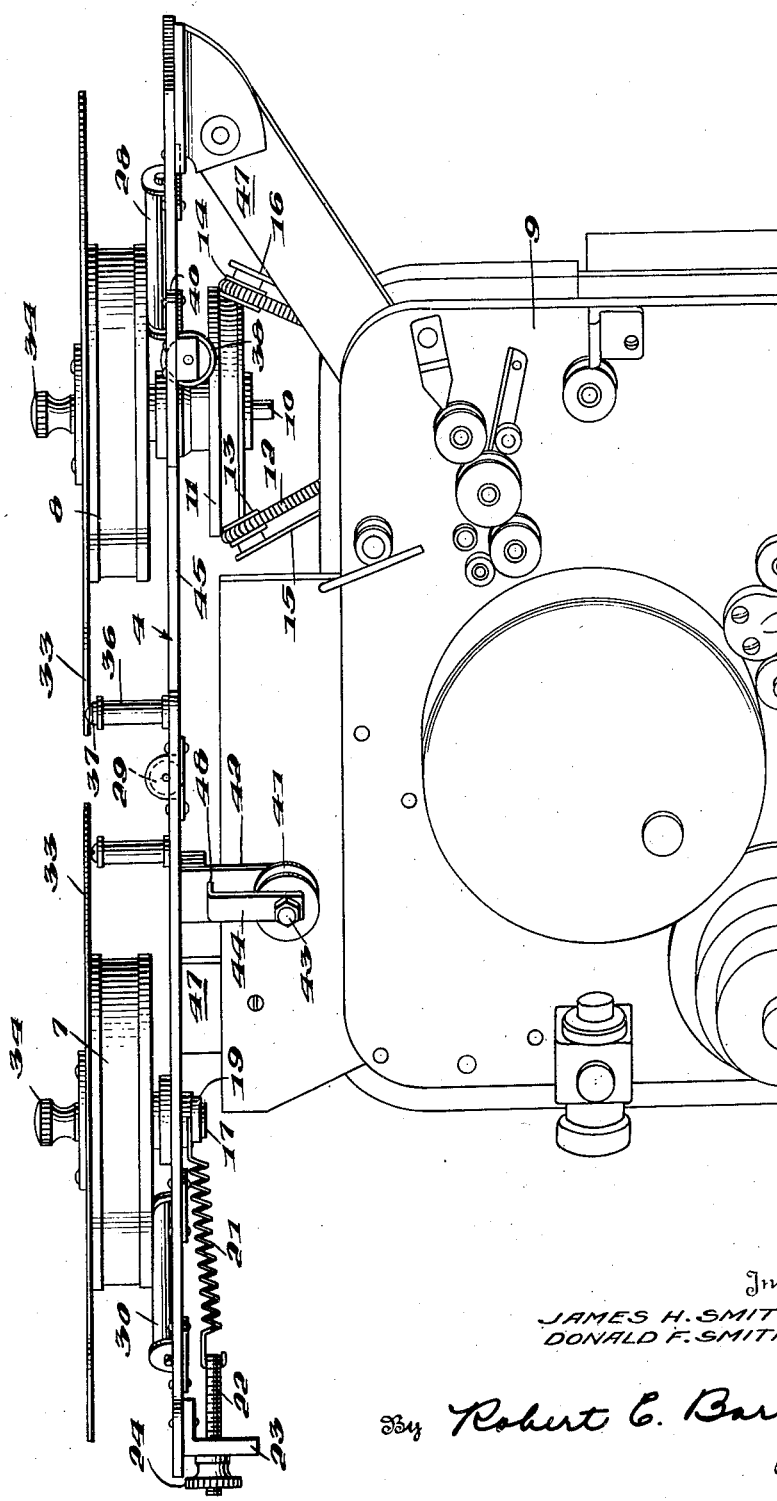

2,499,119

UNITED STATES PATENT OFFICE 2,499,119

FEEDING AND TENSIONING MEANS FOR CONTINUOUS FILM

James H. Smith and Donald F. Smith, Northport, N. Y.

Application May 28, 1948, Serial No. 29,708

5 Claims. (Cl. 88—18.7)

This invention relates to film feed mechanism, and more particularly to a novel mechanism for feeding photographic film in a continuous manner to a motion picture projector or the like.

One of the objects of the invention is to provide mechanism designed to feed film to a motion picture projector, and to take-up such film in a continuous band or loop, at a speed sufficient to permit the projector to operate continuously at standard motion picture projections speeds; thus enabling the picture to be repeated without re-threading or re-winding of film.

Another object is to supply a mechanism primarily designed to eliminate strain on film adjacent the perforations thereof, and to prevent surface abrasions, as well as to avoid strain on the projector itself, as the energy required to drive our mechanism is never more than the energy required to drive the standard film take-up on a non-continuous reel.

A further object is to reduce wear and friction on film, by providing mechanism which will pull the film layers or convolutions away separately from the inner side of the band or loop, and not cause one layer to drag against the preceding layer.

Another object is to provide continuous film feed mechanism designed to position the convolutions of film, forming the loop, in a horizontal location, so that all film passing through the mechanism rides on its edge on anti-friction rollers.

A still further object is the provision of a semi-automatic tension control, constructed and arranged to always exert proper tension on the film, while it is in motion, in order to maintain a certain rigidity of the film, while riding on edge in its travel around a pair of reels or drums.

Another object is to provide mechanism of the above character, so constructed as to permit removal of a continuous film from the feed mechanism without breaking the endless band forming the continuous strip of film.

With the foregoing objects outlined, and with other objects in view which will appear as the description proceeds, the invention consists in the novel features hereinafter described in detail, illustrated in the accompanying drawings, and more particularly pointed out in the appended claims.

In the drawings:

Fig. 1 is a top plan view of our improved film feed mechanism, showing convolutions of the film forming a band or loop about the drums or reels of the feed mechanism.

Fig. 2 is a similar view with the top disks of the drums, and the continuous web of film, removed.

Fig. 3 is a side elevation, showing the mechanism mounted on a conventional motion picture projector, and with the film removed.

Referring to the drawings, 4 designates a horizontally disposed base plate, having bearings 5 and 6 for drums or reels 7 and 8, arranged above the plate in spaced relation, for movement about vertical axes. The drum 8 is driven (Fig. 3) by any suitable means, in synchronism with the motion picture projector 9. For example, the shaft 10 of the drum may be provided, below the base plate, with a fixed sheave 11, driven by a belt 12, actuated by the projector. The belt is trained about idler pulleys 13 and 14, supported by brackets 15 and 16, which extend upwardly from the casing of the projector, and are rigidly connected thereto.

The idler reel or drum 7 has a shaft 17, extending downwardly through an arcuate slot 18 in the plate 4, and said shaft is movable with a lever 19, one end of which is pivotally supported at 20, by a pin depending from the plate. The other end of the lever is connected to one end of a coil spring 21, which yieldingly urges the idler reel constantly away from the driving reel 8. The opposite end of the spring is connected to a screw 22, extending loosely through a bracket 23, depending from the plate 4. A hand nut 24 has threaded engagement with the screw, and bears against the bracket to permit manual adjustment of the tension of the spring 21.

As best shown in Fig. 2, idler supporting rolls 25, 26, 27, 28, 29 and 30 are horizontally arranged in suitable bearings of the base, so as to extend above the upper surface of the plate 4, and form an antifriction support for the lower edge of the web of film 31, as the latter travels around the reels while above the plate 4. The rolls 25 and 30 are preferably arranged substantially radially of the drum 7, and extend outwardly from the periphery thereof, while the rolls 27 and 28 are arranged radially with respect to the drum 8, and project away from the periphery thereof.

Both drums have smooth peripheries, and when a band or loop 32, formed by several convolutions of the film web 31, are wound about the drums, the band or loop will be prevented from rising by means of disks 33, secured to the axles or shafts of the drums by hand screws 34, or the like. Fig. 2 shows the mechanism with the hand screws and disks removed.

To limit outward movement of the film web in the event of breakage thereof, vertical rollers 35, 36, are preferably mounted on the base plate, and extend upwardly therefrom, adjacent opposite edges of said plate, and the shaft of the idler 36 may be provided with an overhanging arm 37, to prevent upward movement of the strip of film in the event of breakage.

The web of film, in travelling to the exterior of the band or loop 32 passes upwardly, and then over a horizontal roller 38, journalled in suitable bearings, supported by the base plate, and arranged in an aperture 39, extending through the plate near one edge thereof and arranged adjacent to the driving reel 8. The plate has a slit 40, extending inwardly from said edge to the aperture, to facilitate threading the film web onto the roller 38, or removing the same therefrom.

Another idler 41 is journalled in a bracket 42, rigidly depending from the plate 4, and the shaft 43 about which the idler rotates, supports a film guide 44. The idler 41 receives the film web from the inner side of the loop or band 32, and directly from the periphery of the drum 8. To aid in threading of the film or removal thereof, the base plate has a large slot 45, extending inwardly from one of its side edges adjacent to the driven reel 8, and spaced from the idler reel 7.

The film web is provided with conventional sprocket-teeth receiving slots 46, which co-act with the sprocket-teeth (not shown) of the projector 9, but as the reels 7 and 8 have smooth peripheries, it will be understood that no teeth extend through the slots 46, as the web travels about our feeding and take-up mechanism.

Before describing the operation of the mechanism, it might be well to note that the film web leaving the projector, travels about the idler 38, and is then turned 90° before proceeding onto the outside of the loop 32, while the film, after travelling about the periphery of the reel 8, leaves the inside of the loop and is twisted in passing downwardly through the slot 46 from the reel 8 and about the idler 41, before entering the feed mechanism of the projector 9.

Our mechanism may be supported by the projector in any suitable manner. For example, the base plate 4 can be arranged on bracket arms 47 (Fig. 3), projecting upwardly from the casing of the projector 9.

The operation of the mechanism is as follows: Drive pulley 11 is driven by the belt 12 from the projector on which the unit is used. The pulley drives film drum or reel 8, which engages the inner layer or convolution of the film loop 32. Reel 8 moves the film through a 90° twist over the film feed guide roller 41 into the projector at the proper speed, to avoid any tension that would damage the film. When the latter has passed through the projector, it is taken up over the guide roller 38, onto the outside of the band 32, and the web, in travelling about the drums 7 and 8, will be supported at its lower edge on the horizontal rolls 25—30.

The take-up film tension, that is, the tension of the film as it leaves the projector, and feeds over the roller 38, is adjusted by means of the nut 24 which acts on the spring 21 to yieldingly pull the drum 7 away from drum 8. If any irregularities should appear in the film web, caused by varying temperature or humidity, it is automatically compensated for by the spring 21 without destroying the proper take-up tension, as the film is taken up onto our mechanism from the projector, without causing abnormal feed tension on the web as it enters the projector from guide roller 41.

When the film is to be removed from our mechanism, the disks 33 may be taken off of their shafts, and the loop 32 can be lifted off the drums 7 and 8. Then the web can be moved through the slit 40 and another portion of the web may be removed between the upper end 48 of the film guide 46 and bracket 42; after which the film can be detached from the projector in the usual manner.

The following advantages are inherent in feed and take-up mechanism of our design:

(a) Extremely long wear of film and sound track (if used), due to lack of friction, strain and abrasive action.

(b) Simplicity of design and operation.

(c) Ease of loading since film may be spliced before loading operation.

(d) Ease of unloading as it is unnecessary to sever the film web in order to remove it from the mechanism.

(e) The length of the web is practically unlimited.

While we have disclosed what we now consider to be a preferred embodiment of the invention in such manner that the same may be readily understood by those skilled in the art, we are aware that changes may be made in the details disclosed, without departing from the spirit of the invention, as expressed in the following claims.

What we claim and desire to secure by Letters Patent is:

1. In a mechanism of the character described, a substantially horizontal base plate, means arranged at the bottom of the plate for supporting the same on a moving picture projector or the like, first and second rotatable drums arranged in spaced relation above the plate and adapted to receive a loop formed of a plurality of convolutions of a web of photographic film which is wound about the drums, a first vertical shaft fixed to the first drum and extending through the base plate, means arranged below the base plate for driving the first shaft, a second shaft extending through the base plate, the second drum being rotatable about the axis of the second shaft, the base plate having an opening therethrough through which the second shaft extends to allow the second shaft to move toward and away from the first shaft, a lever pivotally connected to the base plate and through which the second shaft extends, spring means connected to the lever for yieldingly urging the second shaft away from the first shaft, manually operated means operatively connected to the spring means and to the base plate for adjusting the spring means, a guide operatively connected to the plate for guiding the film web from the projector onto the outer side of said loop as the web travels around the second drum, another guide arranged beneath the plate to receive the web from the periphery of the first drum as the film moves toward the projector, said plate being provided with means to permit the web to travel through the plate from the first drum to the last-mentioned guide.

2. In a mechanism of the character described, a substantially horizontal base plate, supporting means at the bottom of said plate to facilitate mounting the plate on the top of a moving picture projector or the like, first and second rotatable drums arranged in spaced relation above the plate and adapted to receive a loop formed of a multiplicity of convolutions of a web of photographic film, a first vertical shaft fixed to the first drum and extending downwardly through the base plate, means fixed to said shaft and arranged below the base plate for driving the shaft, said base plate having a slot arranged in spaced relation to said shaft, a second shaft extending through said slot, the second drum being rotatable about the axis of the second shaft and said slot permitting the second shaft to move toward and away from the first shaft, a lever pivotally connected to the base plate and arranged below the latter, said second shaft extending through the lever and being movable with the latter, spring means connected to the lever for yieldingly urging the second shaft away from the first shaft, manually operated means operatively connected to the spring means and to the base plate for adjusting the force of the spring means, horizontal supporting rolls journalled to the base plate and projecting above the latter so as to support the loop as the web travels about said drums, a horizontal guide roller arranged near one edge of the base plate adjacent to the first drum for guiding the film web from a projector onto the outer side of said loop as the web passes about the second drum, a bracket depending from the base plate, a second horizontal guide roller supported by said bracket and arranged beneath the base plate for guiding the web while it passes from the periphery of the first drum to the projector, said base plate having slots extending inwardly from the edge thereof to facilitate passage of the web to and from said guide rollers and to allow the web to travel from the first drum to the second guide roller.

3. In a mechanism of the character described, a substantially horizontal base plate adapted to be mounted on a moving picture projector or the like, first and second rotatable drums arranged in spaced relation above the plate and adapted to receive a loop formed of a web of film, a first vertical shaft fixed to the first drum and extending through the base plate, means arranged below the base plate and driving the first shaft, a second vertical shaft for the second drum, a guide roller journalled in said plate to receive a film web from the projector and feed the web onto the second drum, another guide roller arranged beneath the plate to receive the web from the first drum, and said plate being provided with a slot extending inwardly from one edge of the plate to permit the web to travel through the plate from the first drum to the last-mentioned guide roller.

4. In a mechanism of the character described, a substantially horizontal base plate adapted to be mounted on a moving picture projector or the like, first and second rotatable drums arranged in spaced relation above the plate and adapted to receive a loop formed of a web of film, a first vertical shaft fixed to the first drum and extending through the base plate, means arranged below the base plate and driving the first shaft, a second vertical shaft for the second drum, a guide roller journalled in an opening in said plate to receive a film web from the projector and guide the web onto the second drum, another guide roller arranged beneath the plate to receive the web from the periphery of the first drum, and said plate being provided with a slit extending from a side edge thereof to said opening to permit the web to travel through the plate from the projector.

5. In a mechanism of the character described, a substantially horizontal base plate adapted to be mounted on a moving picture projector or the like, first and second rotatable drums arranged in spaced relation above the plate and adapted to receive a loop formed of a web of film, a first vertical shaft fixed to the first drum and extending through the base plate, means arranged below the base plate and driving the first shaft, a second vertical shaft for the second drum, a guide roller journalled in said plate to receive a film web from the projector and feed the web onto the second drum, another guide roller arranged beneath the plate to receive the web from the first drum, said plate being provided with a slot extending inwardly from one edge of the plate to permit the web to travel through the plate from the first drum to the last-mentioned guide roller, and said plate having a slit therein extending inwardly from one edge of the plate to permit the web to be arranged over the first guide roller.

JAMES H. SMITH.
DONALD F. SMITH.

REFERENCES CITED

The following references are of record in the file of this patent:

UNITED STATES PATENTS

| Number | Name | Date |
|---|---|---|
| 1,459,795 | Pavely et al. | June 26, 1923 |
| 1,560,139 | Bow | Nov. 3, 1925 |
| 1,887,664 | Stechbart | Nov. 15, 1932 |
| 2,319,092 | Spence, Jr. | May 11, 1943 |

FOREIGN PATENTS

| Number | Country | Date |
|---|---|---|
| 290,839 | Great Britain | May 24, 1928 |
| 421,658 | France | Dec. 28, 1910 |